April 19, 1966   H. M. ROBINSON   3,247,432
MODULATOR FOR VARIABLE SPEED MOTOR
Filed June 7, 1962   6 Sheets-Sheet 1

Fig. 1a.

INVENTOR.
HORACE M. ROBINSON
BY
Flam and Flam
ATTORNEYS.

April 19, 1966  H. M. ROBINSON  3,247,432
MODULATOR FOR VARIABLE SPEED MOTOR
Filed June 7, 1962  6 Sheets-Sheet 2

FIG. 1b.

INVENTOR.
HORACE M. ROBINSON
BY
Flam and Flam
ATTORNEYS.

April 19, 1966  H. M. ROBINSON  3,247,432
MODULATOR FOR VARIABLE SPEED MOTOR
Filed June 7, 1962  6 Sheets-Sheet 6

FIG. 5.

INVENTOR.
HORACE M. ROBINSON
BY
Flam and Flam
ATTORNEYS.

United States Patent Office 3,247,432
Patented Apr. 19, 1966

3,247,432
MODULATOR FOR VARIABLE SPEED MOTOR
Horace M. Robinson, Los Angeles, Calif., assignor to Space Ships Incorporated, Los Angeles, Calif., a corporation of Nevada
Filed June 7, 1962, Ser. No. 200,840
9 Claims. (Cl. 318—138)

This invention relates to a variable speed motor of the type described and claimed in my copending application, Serial No. 50,892, filed August 22, 1960 entitled Variable Speed Motor.

A motor of this type has a stator structure provided with windings that resemble multiple phase windings. However, the winding sections are excited by a common single phase source, but the excitation envelope of the several sections are modulated in multiple phase relationship. Upon multiphase modulation of the excitation envelope at a selected frequency, the resultant field moves angularly about the stator and at a corresponding rate. A salient pole rotor follows the field rotation.

The primary object of this invention is to provide a circuit whereby the modulation envelope is applied to the line voltage for achieving an appropriate operation.

The manner in which rotation is accomplished may be understood by considering the winding sections as having axes fixed relative to the stator. If one section is excited in phase with the excitation of an adjacent section, then the resultant field will occupy a position intermediate the axes of the sections, the exact position being dependent upon the relative excitation of the sections.

The field can be made to progress continuously about the stator from sections 1, 2, 3, 4, 5 etc. by starting with full excitation of section 1; then by decreasing the excitation of section 1 while increasing the excitation of section 2, all other sections being quiescent; then increasing the excitation of section 3 while decreasing the excitation of section 2, all other sections being quiescent; etc.

By using a multiple of four sections, it is possible, by unique control of relative phase, to continue excitation of all of the sections in accordance with the modulation envelope and yet achieve a rotation of the field. With such an arrangement, the magnetic circuits need not be specially designed, and the modulation of the line voltage of several sections can be accomplished readily, since the function is in a sense continuous.

Hence in a four section stator, there is a 1–3 axis and a 2–4 axis. Sections 1 and 3 cooperate to produce pulsing fields on the common 1–3 axis, and in alternation. Sections 2 and 4 similarly cooperate on a quadrature axis. Now, starting with full excitation of sections 1 and 3, the excitation of sections 2 and 4 is increased while the excitation of sections 1 and 3 is reduced. Hence the resultant field shifts with substantially uniform motion, to the 2–4 axis.

During this movement, the sections 1 and 2 are producing fields at the same instants, and sections 3 and 4 are also producing fields at the same instants. To continue the rotation of the field from the 2–4 axis, the excitation of sections 1 and 3 must be increased while the excitation of sections 2 and 4 is decreased. But now section 2 must produce its field at the same instant as section 3 rather than with section 1, for otherwise the field would return to the initial position assumed. Thus for the second quadrant of movement, sections 2 and 3 produce magnetic fields at the same instants and in alternation with sections 4 and 1.

It is thus apparent that there must be a phase reversal of sections 1 and 3 relative to sections 2 and 4 at each section axis in order for rotation to progress. This is accomplished conveniently by reversing the phase of those sections that pass through zero amplitude as determined by the modulation envelope. This is achieved by utilizing companion sets of unidirectionally conductive switches, as for example unijunction transistors that are fired by companion sources having a 180° phase displacement, both switches of each pair being controlled by 180° related phases of a four phase supply. The result, as may best be appreciated by graphic representations, is that the required phase shift is automatically obtained.

An object of this invention is to achieve the foregoing functions and by utilizing unique circuit means in combination with a controllable frequency multiphase source.

In order to reverse the direction of rotation of the field, and correspondingly to reverse the direction of motor rotation, it is merely necessary to reverse the polarity of two of the phases.

This invention possesses many other advantages, and has other objects which may be made more clearly apparent from a consideration of several embodiments of the invention. For this purpose, there are shown a few forms in the drawings accompanying and forming part of the present specification. These forms will now be described in detail, illustrating the general principles of the invention; but it is to be understood that this detailed description is not to be taken in a limiting sense, since the scope of the invention is best defined by the appended claims.

Referring to the drawings.

*Brief description*

The purpose of the modulator is to produce two or more phases of source voltage modulated in accordance with a like number of phases of controlled frequency supply including the phase reversible source voltage each time the modulator envelope is substantially zero. Consider the simplest form of two phase modulated supply, and assume a circuit in which all outputs are common to one side of the source, thereby necessitating four motor windings, with one side of all motor windings common to the other side of the source, similar to a "push-pull" two phase or quarter phase inverter. Required, then, are 2MN unijunctions where M is the number of motor windings and N is the number of source phases, or in this case eight unijunctions. These eight unijunctions correspond to all possible combinations of phases of source and controlled frequency supply. Each unijunction is so connected that it fires only when its source voltage and its controlled frequency supply are both positive. Thus, four unijunctions control current in a 1–3 axis and the other four in a 2–4 axis. Likewise, four unijunctions control current in the positive half cycle of the source and the other four control the negative half cycles. The controlled frequency source fires the four positive half cycles sequentially, each unijunction on for one-half the cycle of the control frequency source. Similarly, for the other four controlling the negative half cycle, except that a positive half of cycle No. 1 is followed by a negative half of cycle No. 3 and later a negative half cycle of No. 1 is followed by a positive cycle of No. 3. The unijunction firing circuits are biased base 2 to base 1 by a trapezoid of positive current formed by alternate half cycles of source voltage. This trapezoidal source current is derived by clipping the source sine wave at about one fifth its peak voltage. The capacitor at the emitter of each unijunction is charged by its phase of controlled frequency supply via charging a resistor, and the maximum charging rate is regulated so that the capacitor is charged in a time short enough to allow the motor current to flow for the desired length of time. Sufficient volt seconds substantially fully magnetize the motor iron circuits. As controlled frequency supply voltage decreases, conducting angle is reduced at the end of one half cycle of this phase of controlled frequency supply, this unijunction stops conducting and remains quiescent for the second half cycle of controlled frequency supply.

Figure 1A:
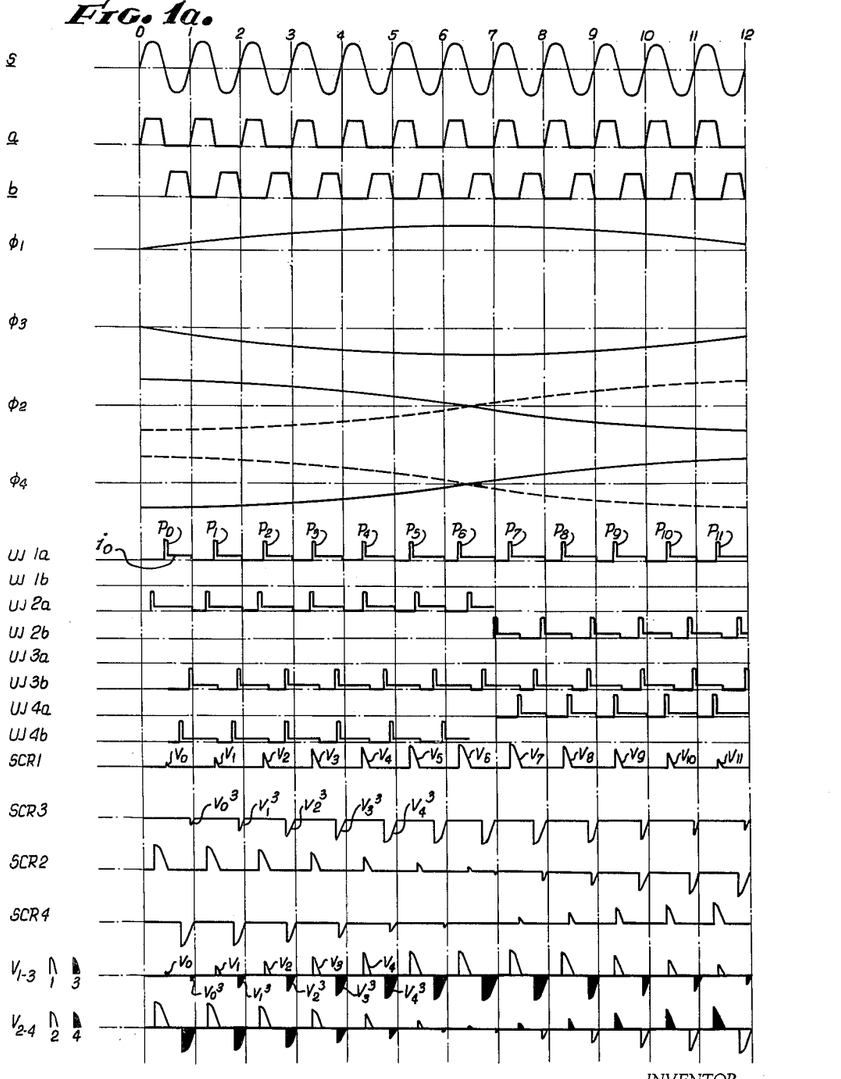
FIGURES 1a and 1b are diagrams illustrating the manner in which the excitation of the several phases is derived.
Figure 1B:
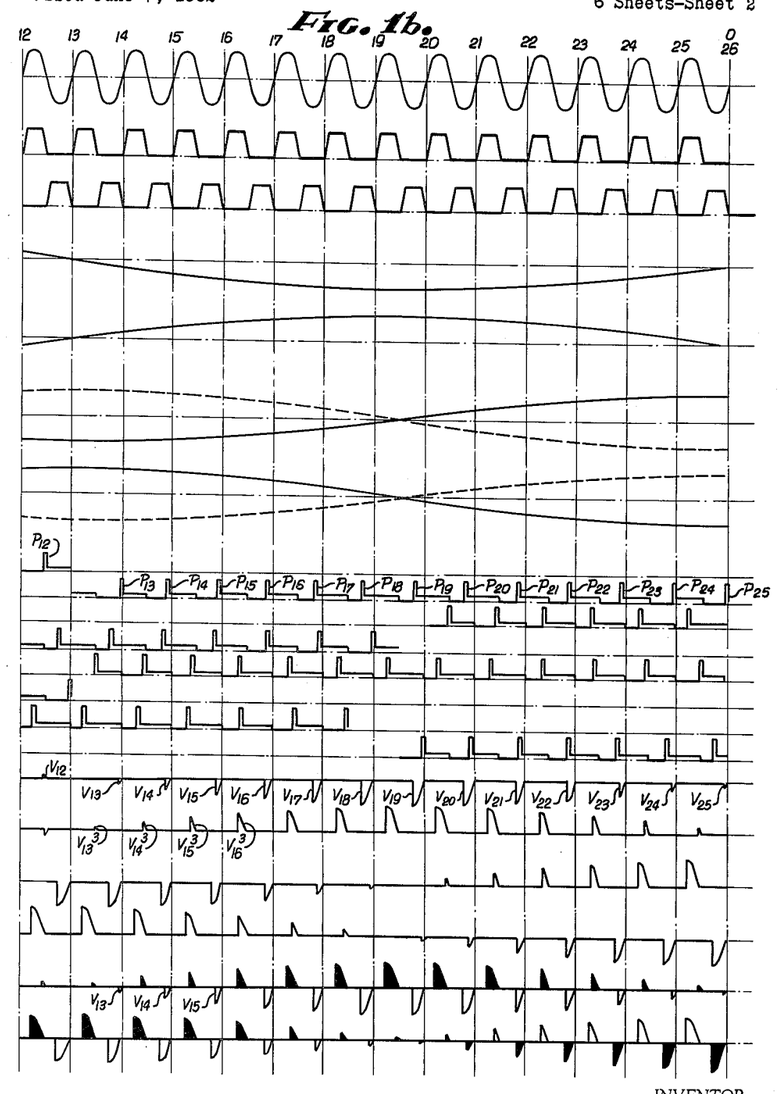

Referring to FIGURE 1, this is the source voltage and $a$ and $b$ are the clipped and rectified versions of this same source voltage as sent to base 2 of the unijunctions. Note all $a$ unijunctions are set at $a$ voltage to base 2 and all $b$ unijunctions are set at $b$ voltage to base 2. $\phi_1$, $\phi_2$, $\phi_3$ and $\phi_4$ are the four phases of controlled frequency supply, one cycle of which in this drawing is shown as traversing twenty-six cycles of source voltage. The dotted lines at $\phi_2$ and $\phi_4$ are to show the interchangeability of a pair of phases and to indicate that the supply is basically two phase with phase inversion.

As a result of the combination of base 2 voltage and phase voltage $\phi$, each unijunction fires differently. This is shown in UJ1$a$ to UJ4$b$ respectively. Knowing how the amplitude of $\phi$ causes respective unijunction to vary at firing angle, in a circuit of FIGURES 2 and 3, the unijunctions fire silicon controlled rectifiers and two unijunctions fire one silicon controlled rectifier, the two unijunctions chosen being two that fire at opposite halves of the controlled circuit supply so that at very low frequencies at least two silicon controlled rectifiers will always be sharing the load. The voltage across the load due to each silicon controlled rectifier is shown in FIG. 1 at SR1, SR2, SR3, SR4. Note how the change in firing angle of the unijunctions causes the area enclosed within the SCR firing time to follow the shape of its original phase voltage $\phi$. When one considers that the windings 1 and 3 are about a common axis in a motor, the effect of these two combine in a magnetic structure and this is shown by the representation in $V_{1-3}$; similarly, at $V_{2-4}$. The net result at $V_{1-3}$ and $V_{2-4}$ is produced two output phases of a common source voltage modulated in quadrature by a controlled frequency supply and with a phase reversal of the source voltage in each output phase at the instant of substantially zero voltage of each phase of controlled frequency supply.

*Detailed description*

Figure 3:
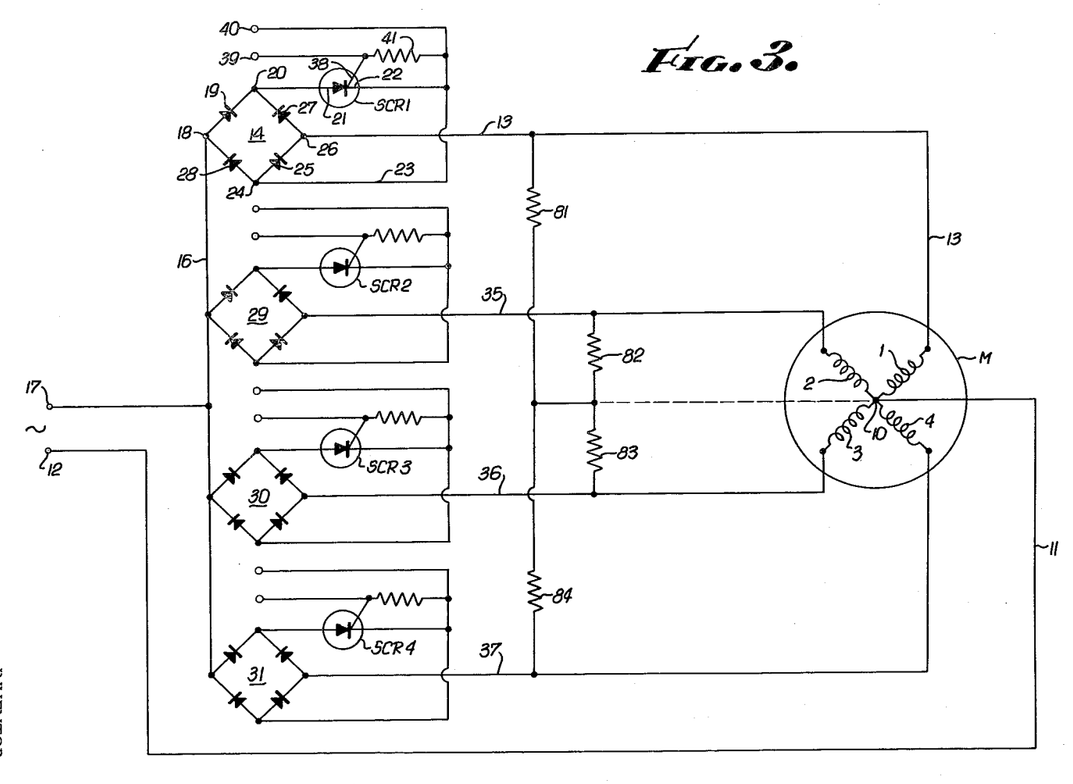
FIG. 3 is a wiring diagram illustrating how the firing pulses are utilized to achieve conduction in the several phase windings of the stator structure.

In FIG. 3 there is illustrated diagrammatically a motor M having four winding sections 1, 2, 3 and 4. These winding sections when separately excited are capable of producing fields having distinct axes located respectively in successive 90° positions about the stator.

The field axis of section 1 and section 3 is common, and the field axis produced by section 2 is common to that produced by section 4. A salient pole rotor (not shown), preferably of the type shown and described in my above-identified copending application, forms a part of the motor M. Such a rotor may have two poles capable of alignment with the 1–3 axis or the 2–4 axis.

Each of the winding sections 1, 2, 3 and 4 is excited from a common single phase source, as, for example, a 115-volt, 60-cycle source. The winding sections can be designed for a different source, as, for example, a 24-volt, 440-cycle source. The winding sections 1, 2, 3 and 4 are excited in a manner shown in FIG. 1 and the diagrams $V_{1-3}$ and $V_{2-4}$. FIG. 1 illustrates the occurrences during one revolution of the rotor, which in this instance occurs during twenty-six cycles of the source. Diagram $V_{1-3}$ discloses the voltage applied to sections 1 and 3, and diagram $V_{2-4}$ discloses the voltage applied to sections 2 and 4. The voltages comprise pulses of varying amplitudes and durations that repeat at about a constant frequency. The voltage pulses for sections 1 and 2 are unshaded whereas the voltage pulses for sections 3 and 4 are shaded. A legend appears to the left of diagrams $V_{1-3}$ and $V_{2-4}$.

The voltages applied are actually portions of the source voltage appearing at diagram $s$. For reference purposes successive 0° positions of the line voltage are numbered from 0–26, coresponding to successive times $t_0$ to $t_{26}$. Intermediate times are referred to by decimals. In the present example, the cycle repeats such that $t_{26}$ is the same as $t_0$. Between times $t_0$ to $t_{13}$, as shown at diagram $V_{1-3}$, winding section 1 is conductive during portions of the positive halves of the line voltage shown at $s$ (the pulses being above the axis), whereas winding section 3 is conductive during portions of the negative halves of the line voltage shown at $s$ (the pulses being shown below the axis). During the next half cycle, between times $t_{13}$–$t_{26}$, the reverse situation is true. The operation of sections 2 and 4 as shown at diagram $V_{2-4}$ is similar, except that the periods of positive and negative conduction are shifted in time. Thus at time $t_0$ section 1 starts conducting during positive halves of the cycle; at time $t_{6.5}$ section 4 starts such conduction; at time $t_{13}$ section 3 starts such conduction, at time $t_{19.5}$ section 2 starts such conduction, and the cycle repeats. This corresponds to motor rotation as will be presently explained.

Conduction in the several sections during the positive halves of the line voltage commences somewhat in advance of the 180° position of the line voltage and terminates at the 180° position. Conduction during the negative half of the line voltage in the several sections commences somewhat in advance of the 360° or 0° position and terminates at the 360° or 0° position. Just how far in advance of the 180° or 360° position that conduction begins determines the volt-seconds of excitation. At time $t_0$, for example, section 1 is barely conductive, conduction beginning quite close to the 180° position. The conduction angle and the amplitude of excitation for section 1 increase to a maximum of about a 90° conduction angle and then decrease to zero at time $t_{13}$. Conduction then begins in the opposite direction from a minimum conduction angle and amplitude to a maximum conduction angle and amplitude and back again to zero at time $t_{26}$ when the cycle is repeated. With a reversal of polarity and a time delay of one-half cycle of the source, the excitation of section 3 is equivalent to that of section 1.

The conduction angle in sections 2 and 4 is at a maximum when the conduction angle of sections 1 and 3 is at a minimum, and as depicted at diagram $V_{2-4}$. However, as in connection with sections 1 and 3, the conduction angle of sections 2 and 4 is maximum at substantially the same time and minimum substantially at the same time.

Sections 1 and 3 produce fields or field pulses in alternations, the field pulses produced by section 1 terminating before section 3 field pulses, and vice versa. Successive field pulses build in force and decay in force. Furthermore, the polarity of the magnetic impulses also shifts at time $t_{13}$ and $t_{26}$. Thus, for example, north poles may be formed between times $t_0$ to $t_{13}$ and south poles may be formed between times $t_{13}$ to $t_{16}$. The rotor, at the source frequency, however, does not respond to field polarity but only to its intensity and location at the stator.

While sections 1 and 3 are producing field pulses of relatively small force, sections 2 and 4 are producing field pulses of maximum force, as can be perceived from a comparison of diagrams $V_{1-3}$ and $V_{2-4}$.

The rotation of maximum field strength can be understood from a consideration of the diagrams $V_{1-3}$ and $V_{2-4}$. At time $t_0$ the field pulses of sections 2 and 4 are at a maximum and the field pulses of sections 1 and 3 are negligible. Hence it may be assumed that the rotor lines up with the axes of windings 2 and 4. Winding sections 1 and 3 now begin pulsing with sections 2 and 4 respectively and with relatively increasing intensity. Hence the rotor is pulled away from 2 and 4 and towards 1 and 3 respectively until, at time $t_{6.5}$ it can be assumed that the rotor is aligned with winding sections 1 and 3.

To continue the angular movement in the same direction, winding section 4 (not winding section 2) must now begin to pulse with section 1. If instead section 2 pulsed with section 1, then the net force on the rotor would return in the opposite direction, and oscillation would result. Hence at time $t_{6.5}$ sections 1 and 4 must pulse together, and sections 3 and 2 must pulse together. This is clearly shown at diagrams $V_{1-3}$ and $V_{2-4}$ between times $t_{6.5}$ and $t_{13}$. By the same token at times $t_{13}$ to $t_{19.5}$, sections 3 and 4 must again pulse together and sections 1 and 2 must pulse together, and at times $t_{19.5}$ to $t_{20}$, sections 4 and 1 must pulse together and sections 2 and 3 must pulse together.

In order to achieve the foregoing operation, there must be a phase shift of field pulses of sections 1 and 3 or sections 2 and 4 at times $t_0$, $t_{6.5}$, $t_{13}$ and $t_{26}$. Conveniently, field pulses of sections 2 and 4 shift in phase at time $t_{6.5}$ and $t_{19.5}$, the field pulses of sections 1 and 3 shift in phase at times $t_0$, $t_{13}$, and $t_{26}$.

The frequency at which the conduction angle of the pulses builds from a minimum to a maximum determines the speed of rotation. A four-phase controllable frequency supply 9 shown in FIG. 2 controls or determines this frequency. The supply 9 produces at leads $\phi_1$, $\phi_2$, $\phi_3$ and $\phi_4$ voltages with respect to a neutral lead N shown in FIG. 1. In this example, the voltages build up in the sequence $\phi_1$, $\phi_4$, $\phi_3$ and $\phi_2$ which, in a manner to be explained hereinafter, determines one direction of rotation. However, by operation of a polarity reversing switch P (FIG. 2), the sequence can be changed to 1, 2, 3, 4 and as depicted by the dotted-line showing for $\phi_2$ and $\phi_4$ in FIG. 1. By adjusting four phase power supply 9, manually or in response to programmed material, the common frequency of the phases can be changed from a theoretical zero to a rated value.

The line voltage shown at $s$ (FIG. 1) is applied to the several winding sections 1, 2, 3 and 4. This is shown in FIG. 3. The sections 1, 2, 3 and 4 in this example are connected in star, there being a center or neutral tap 10 that connects via a lead 11 to one terminal 12 cooperable with the single phase source. The side of winding section 1 remote from the neutral 10 connects via a lead 13, a full wave rectifier 14, and silicon controlled rectifier SCR 1 via a lead 16 to a terminal 17 cooperable with the other side of the supply.

When the source terminal 17 is positive with respect to the source terminal 12 and when the silicon controlled rectifier SCR 1 is switched on, a circuit for the winding section 1 can be traced as follows: terminal 17, lead 16, terminal 18 of the full wave rectifier network 14, diode 19, quadrature terminal 20 of the rectifier 14, anode 21 and cathode 22 of SCR1, cathode lead 23, to the other quadrature terminal 24 of the rectifier 14, diode 25, terminal 26 of the rectifier network 14, to lead 13, winding section 1, neutral terminal 10, lead 11, to the source terminal 12.

When the source terminal 12 is positive relative to the source terminal 17, a similar network may be traced as follows: terminal 12, lead 11, neutral tap 10, winding section 1, lead 13, terminal 26, a diode 27, quadrature terminal 20, anode 21 and cathode 22 of SCR1, lead 23, quadrature terminal 24, a diode 28, terminal 18 and lead 16 to the source terminal 17.

Similar rectifier networks 29, 30 and 31 and silicon controlled rectifiers SCR2, SCR3 and SCR4 establish similar circuits to the winding sections 2, 3 and 4, there being leads 35, 36 and 37 extending from the rectifier networks 29, 30 and 31 to corresponding sides of the winding sections 2, 3 and 4. The other sides of the winding sections 2, 3 and 4 connect to the neutral terminal 10.

A voltage applied between the gate 38 and the cathode 22 of the SCR1 operates to turn the SCR1 to its "on" state in which it will remain until current through the SCR1 drops to a minimum value according to the characteristics of the SCR1. Terminals 39 and 40 are connected respectively to the gate 38 and cathode lead 23 for application of an appropriate switching current pulse. A leveling resistor 41 parallels the gate 38 and cathode 22 to cause the input impedance across terminals 39 and 40 to be low and constant. Similar control circuits are provided for the remaining SCR's 2, 3 and 4.

Figure 2:
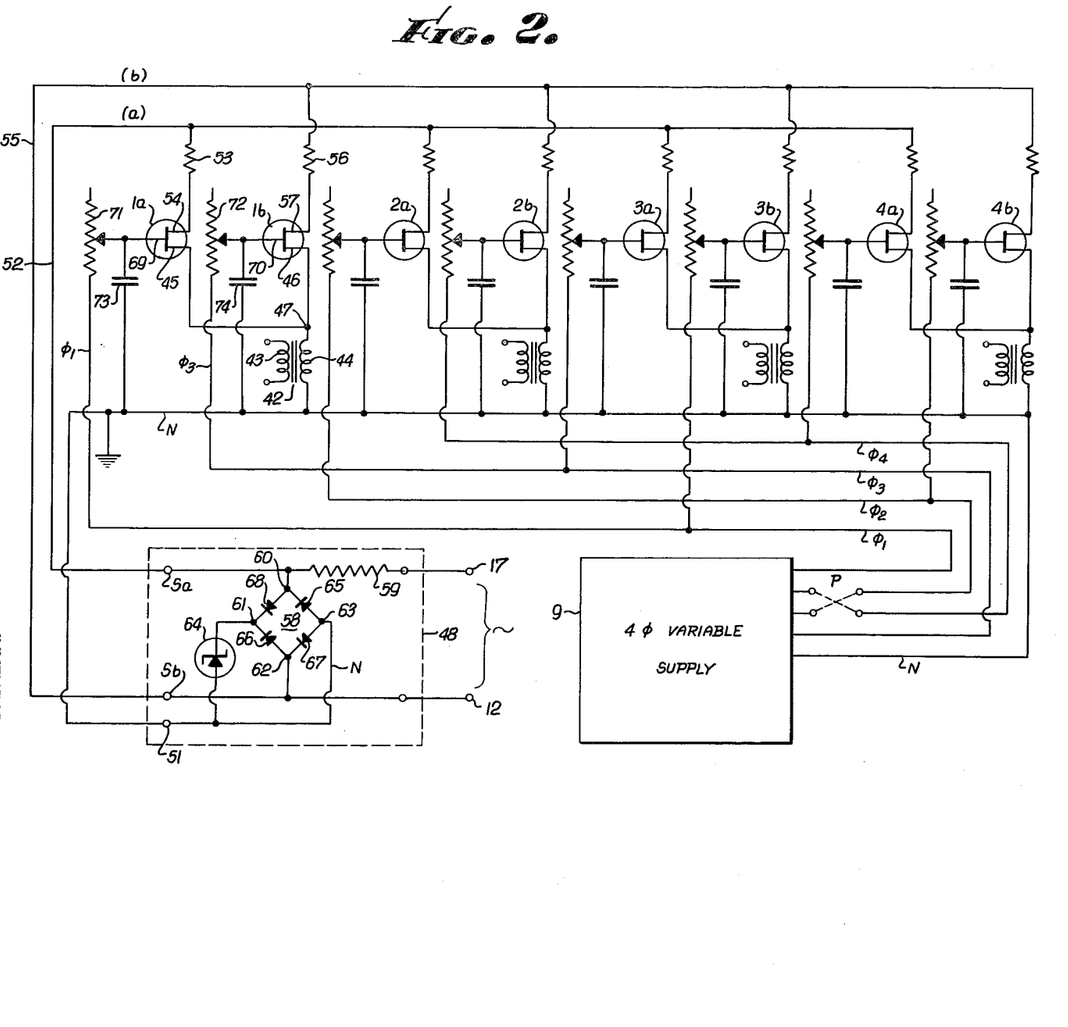
FIG. 2 is a wiring diagram showing in detail the control circuit for achieving firing pulses.

The SCR1, SCR2, SCR3 and SCR4 are respectively fired at times corresponding to the frontal portions of the voltage pulses shown at $V_{1-3}$ and $V_{2-4}$ in FIG. 1. For this purpose, the control circuit shown in FIG. 2 is provided. In FIG. 2 there is illustrated a pulse transformer 42, the secondary 43 of which is connected to the terminals 39 and 40 for firing SCR1.

The pulse transformer 42 has a primary winding 44, one side of which is connected to the neutral lead N common to the power supply 9. The primary winding 44 can be connected either to power supply leads $\phi_1$ or $\phi_3$ respectively via unijunction transistors $1a$ or $1b$ respectively, both of which have bases 45 and 46 connected to the primary terminal 47. The unijunction transistors convert signal amplitude to phase for suitably controlling the SCR's. Other amplitude-phase transducers could be used, as for example, magnetic amplifiers. Those skilled in the art will understand that the circuits can be modified for use of magnetic amplifiers.

At diagram $a$ in FIG. 1 there is shown the interbase voltage applied to the unijunction transistor $1a$. This interbase voltage is substantially trapezoidal in form and it in fact corresponds to positive halves of the source voltage at $s$ clipped at a value below the peak thereof. At $b$ in FIG. 1 is illustrated the interbase voltage applied to the unijunction transistor $1b$. This interbase voltage is identical to that shown at $a$ except that it is displaced 180° to correspond in time with the negative halves of the line voltage shown at $s$.

These substantially trapezoidal voltages $a$ and $b$ are derived from a supplemental power supply 48 having input terminals cooperable with the source terminals 17 and 12 respectively. The power supply 48 has three output terminals 51, $S_a$ and $S_b$. The terminal $S_a$ is connected via a lead 52 and a branch resistor 53 to the opposite base 54 of the unijunction tranisistor $1a$, and the output terminal $S_b$ is connected via a lead 55 and a branch resistor 56 to the other base 57 of the unijunction transistor $1b$. The voltages shown at $a$ and $b$ in FIG. 1 exist at the terminals $S_a$ and $S_b$ for application to the $a$ and $b$ families of transistors.

These voltages are sensed from a circuit that includes a full wave rectifier bridge 58 and a load resistor 59. The bridge 58 has four terminals 60, 61, 62 and 63. A constant voltage device, such as a Zener diode 64, is connected across the quadrature terminals 61 and 63, so that the reverse breakdown voltage is applied thereto and to provide that the voltage at $S_a$ is pulsed the same as the voltage at $S_b$ to eliminate the need for matching two Zener diodes. Diodes 65, 66, 67 and 68 are arranged between the four bridge terminals so as to provide full wave conduction path between the terminals 60 and 62 for a load resistor 59 interposed between source terminals 49 and bridge 58.

When the supply terminal 17 is positive relative to the supply terminal 12, a circuit for load resistor 59 can be traced as follows: terminal 49, load resistor 59, bridge terminal 60, diode 68, quadrature terminal 61, constant voltage device 64, terminal 63, diode 67, to the opposite terminal 62 and input terminal 12.

When the source terminal 12 is positive relative to the source terminal 17, a circuit is completed in which current passes in the same reverse direction through the constant voltage device 63 as follows: source terminal 12, bridge terminal 62, diode 66, quadrature terminal 61, constant voltage device 64, quadrature terminal 63, diode 65, terminal 60, load resistor 59 to the terminal 17.

The voltage across the device 64 must build up to a characteristic breakdown value before any conduction occurs. Once that value is reached, the voltage across the device is constant and independent of current. By connecting the output terminals $S_a$ and $S_b$ to the bridge input terminals 60 and 62, the voltages shown at $a$ and $b$ (FIG. 1) are produced. Thus, when source terminal 17 is moving through zero and increasing in the positive direction as at time $t_0$, then conduction occurs through diode 67, and terminals 62 and 63 are at the same potential. Thus terminal $S_b$ is at the neutral potential of lead N. This accounts for the zero potential lines in curve $b$ (FIG. 1) during first halves of the source voltage cycles. During such half cycles, diode 68 serves to connect the terminals 60 and 61. The terminals 60 being connected to output terminal $S_a$, the terminal $S_a$ must follow the reverse voltage applied to the Zener diode, and as depicted at $a$ in FIG. 1 during the first halves of the source cycles.

When terminal 12 swings positive relative to terminal 17, then diodes 65 and 66 connect terminal $S_a$ to the neutral and the terminal $S_b$ to the Zener diode. Thus during the second halves of the source cycle, terminal $S_a$ is at zero and terminal $S_b$ follows the curve shown at $b$ in FIG. 1.

The unijunctions $1a$ and $1b$ have emitters 69 and 70 that are connected via potentiometer resistors 71 and 72 respectively to the phase leads $\phi_1$ and $\phi_3$. Capacitors 73 and 74 respectively parallel the corresponding emitters 69 and 70 and bases 45 and 46.

When the interbase voltage of a unijunction is zero, the unijunction acts like an ordinary diode. Viewed in another way, the voltage necessary to fire the unijunction is zero because that firing voltage is a constant fraction of the interbase voltage.

Between times $t_{.5}-t_1$; $t_{1.5}-t_2$; $t_{2.5}-t_3$, etc., i.e., during the negative halves of the source cycles, the unijunction $1a$ is "on." This means that only negligible positive charge can be stored in the capacitor 73 because a discharge path exists from one side of capacitor 73 through unijunction $1a$ to terminal 47, winding 44 to neutral lead N. At the same time a small current may flow from source $\phi_1$ via resistor 71 through unijunction $1a$ and winding 44 which has no effect upon the SCR firing. This small current is depicted at the current trace UJ$1a$ in FIG. 1. Actually the value of $i_0$ changes due to sinusoidal variations of $\phi_1$, but since the value of $i_0$ is exaggerated in the trace, this variation is not shown.

When the positive halves of the source voltage begin, i.e., at times $t_0$, $t_1$, $t_2$, etc., the interbase voltage climbs quickly to the Zener value. Due to resistor 71, a charge on capacitor 73 cannot be built up fast enough to permit firing to continue, and unijunction $1a$ turns off. This is so even if the voltage at $\phi_1$ is a maximum. But the capacitor 73 continues to be charged after the interbase voltage reaches the Zener value. Charge builds up on the capacitor 73 at a rate corresponding substantially to the instantaneous value of phase voltage $\phi_1$.

When the phase voltage $\phi_1$ is small, as at $t_0$, the voltage $\phi_1$ may be adequate to build up the capacitor voltage to a firing value, but then only late in the half cycle, and near time $t_{0.5}$. A pulse $p_0$ shown at trace UJ$1a$ is produced. Possibly the voltage on capacitor 73 never builds up enough to fire the unijunction while the interbase voltage is at the Zener value, but when the interbase voltage drops down immediately before time $t_{0.5}$, an interbase voltage will be reached that is low enough to bring about the requisite ratio for firing. In this case the current pulse may be much smaller than the pulse $p_0$. If the pulse is too small, then SCR1 may not fire at all during this first cycle. Or if very late, the volt-seconds may be negligible.

Assuming, however, that a full pulse P is achieved, then the unijunction may thereafter oscillate and produce further pulses until time $t_{0.5}$ when, due to lack of interbase voltage, conduction must be continual. These subsequent pulses are not shown, since they have no effect on the operation of the SCR's. Instead, $i_0$ is shown as commencing just after the first pulse and even before time $t_{0.5}$. Thus the operation is approximately depicted.

At time $t_1$ the phase voltage $\phi_1$ is larger than it was before, and thus the capacitor voltage builds up more quickly; hence the unijunction fires a little quicker. As phase voltage $\phi_1$ further rises, firing becomes more and more advanced in phase. Thus pulses $p_1$, $p_2$, $p_3$, $p_4$, $p_5$ and $p_6$ fire increasingly in advance of their corresponding cycle times $t_{1.5}$, $t_{2.5}$, $t_{3.5}$, $t_{4.5}$, $t_{5.5}$ and $t_{6.5}$. Thus, whereas $p_0$ occurs at phase angle of near 180°, $p_1$ occurs at 170°, $p_2$ at 160°, $p_3$ at 150°, etc.

The pulses $p_0$, $p_1$, $p_2$, etc. of unijunction $1a$ fire the SCR1 through transformer 42. Thus SCR1 passes portions of the line voltage to the motor winding section 1 according to the voltage pulses $V_0$, $V_1$, $V_2$, $V_3$, $V_4$, etc. shown at trace SCR1 in FIG. 1. The leading edges of the pulses $V_0$, $V_1$, $V_2$, etc. respectively correspond in phase with the pulses $p_0$, $p_1$, $p_2$, etc. that produce them. As the pulses $p_0$, $p_1$, $p_2$, etc. advance and retract in phase, so do the voltage pulses $V_0$, $V_1$, $V_2$, etc. The more advanced in phase is the unijunction pulse, the greater is the portion of the source cycle passed by the SCR.

The pulses $V_0$, $V_1$, $V_2$, etc. also form part of the voltage trace shown at $V_{1\text{-}3}$ in FIG. 1.

Unijunction $1a$ is operative during the time that the voltage at phase I is positive because the unijunction $1a$ can conduct only in one direction whatever may be the interbase voltage. Thus, unijunction $1a$ operates between times $t_0$ to $t_{13}$ (see FIG. 1). Unijunction $1b$ operates during the remainder of the cycle, for which purpose it is energized by the voltage at phase III, phase III being of a polarity opposite but equal in magnitude to that of phase I.

A pulse $p_{13}$ is the first pulse produced during the positive part of the cycle of the phase voltage $\phi_3$. Since unijunction $1b$ has its interbase voltage provided by the supplemental power supply terminal $S_b$, the first pulse $p_{13}$, instead of being at a 180° phase relationship relative to the source voltage $s$, it is at the 360° position. Pulses $p_{14}$, $p_{15}$, and $p_{16}$ follow and are responsible for firing of SCR1, as shown in FIG. 1, in the same manner as described in connection with pulses $p_0$, $p_1$, etc. However, the pulses $p_{13}$, $p_{14}$, $p_{15}$, $p_{16}$, etc. occur during the negative halves of the source, at $s$, and hence the SCR voltages $V_{13}$, $V_{14}$, $V_{15}$, $V_{16}$, etc. similarly occur during the negative halves of the cycle. The voltage $V_{13}$, $V_{14}$, $V_{15}$, etc. are shown inverted for clarification. However, it will be understood that the conduction through the SCR's themselves is always in the same direction by virtue of the action of the bridge circuit 14, but the winding section 1 sees a reversal in line polarity.

The voltage $V_{13}$, $V_{14}$, $V_{15}$, and $V_{16}$ also find their components in the trace $V_{1-3}$.

SCR3 is fired in an analogous manner except that the $3a$ unijunction is fired from phase III of the four-phase supply, and the $3b$ unijunction, which is biased by the supplemental power supply terminal $S_b$, is driven by phase I. Thus, during the first half of the control voltage cycle, that is, from time $t_0$ to $t_{13}$, unijunction $3b$ is operable to produce pulses resulting in SCR conduction during negative halves of the cycle as illustrated at $V_0^3$, $V_1^3$, $V_2^3$, etc.

Unijunction 3a produces the pulses $V_{13}^3$, $V_{14}^3$, $V_{15}^3$, etc. during the times $t_{13}$ to $t_{26}$ and in the positive halves of the cycle. Hence, the composite traces shown at $V_{1-3}$ result.

Due to the fact that the unijunctions of any set, as for example, 1a and 1b, are biased by the use of phase terminals $S_a$ and $S_b$, a 180° or 540° phase shift is produced whenever firing changes from the a unijunction to the b unijunction, and vice versa. Thus, the pulse $p_{12}$ is produced at about the 180° position whereas the pulse $p_{13}$ is produced at about the 0° position, all with respect to the source. The condition for continued angular movement in the same direction is thus achieved.

The trapezoidal form of the biasing voltages produced at $S_a$ and $S_b$ ensures discharge of the capacitors prior to the start of the succeeding half cycle. Thus, if the pulse produced by a capacitor dwelled into the succeeding half cycle, a misfiring would occur. As the interbase voltage drops down the sloping portion of the curve, a value must be reached such that the unijunction is turned on (if it is not already in such state) by whatever small voltage may be on the capacitor. The higher the capacitor charge, the sooner will discharging occur. Appropriate discharging is ensured. Further, noise that otherwise would accumulate on the capacitor if the unijunction were not conducting is immediately discharged by the unijunction being in the conducting state, thereby avoiding misfiring. This may be determined by adjustment of the potentiometers 71, 72, etc.

In order to reverse the direction of the motor, it is merely necessary to reverse the polarity of two companion phase voltages, as, for example, the phase voltages II and IV. This results in the dotted-line trace as shown in FIG. 1 for phases II and IV, and is accomplished by the polarity reversing switch P.

The resistors 81, 82, 83 and 84 parallel the respective windings 1, 2, 3 and 4 and provide paths for SCR holding current since motor current is unable to rise instantaneously.

Figure 4:
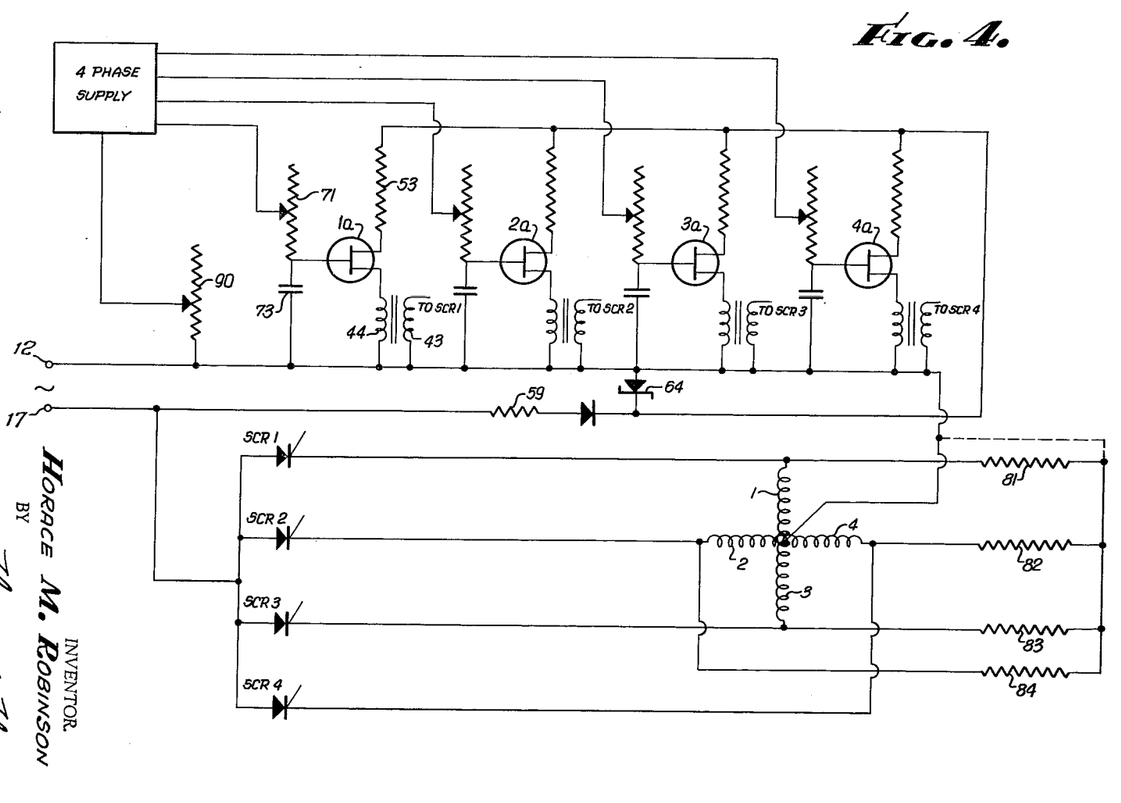
FIG. 4 is a wiring diagram similar to FIG. 2 but illustrating another embodiment of the present invention.

A simpler arrangement which uses only half wave current from the alternating current source is shown in FIG. 4. The relationships of FIG. 1 remain the same except that (1) UJ1b, UJ2b, UJ3b, and UJ4b are omitted, (2) SCR1, SCR2, SCR3, and SCR4 fire only during positive half cycles of the source voltage and (3) $V_{1-3}$ and $V_{2-4}$ have the portions of cycles below the line omitted. A resistor 90 has been added in the return to the four-phase supply to adjust the firing of the SCR's to limit them to the positive half only of each of the four-phase supplies, allowing resistor 71 to adjust the firing angle of each individually.

Figure 5:
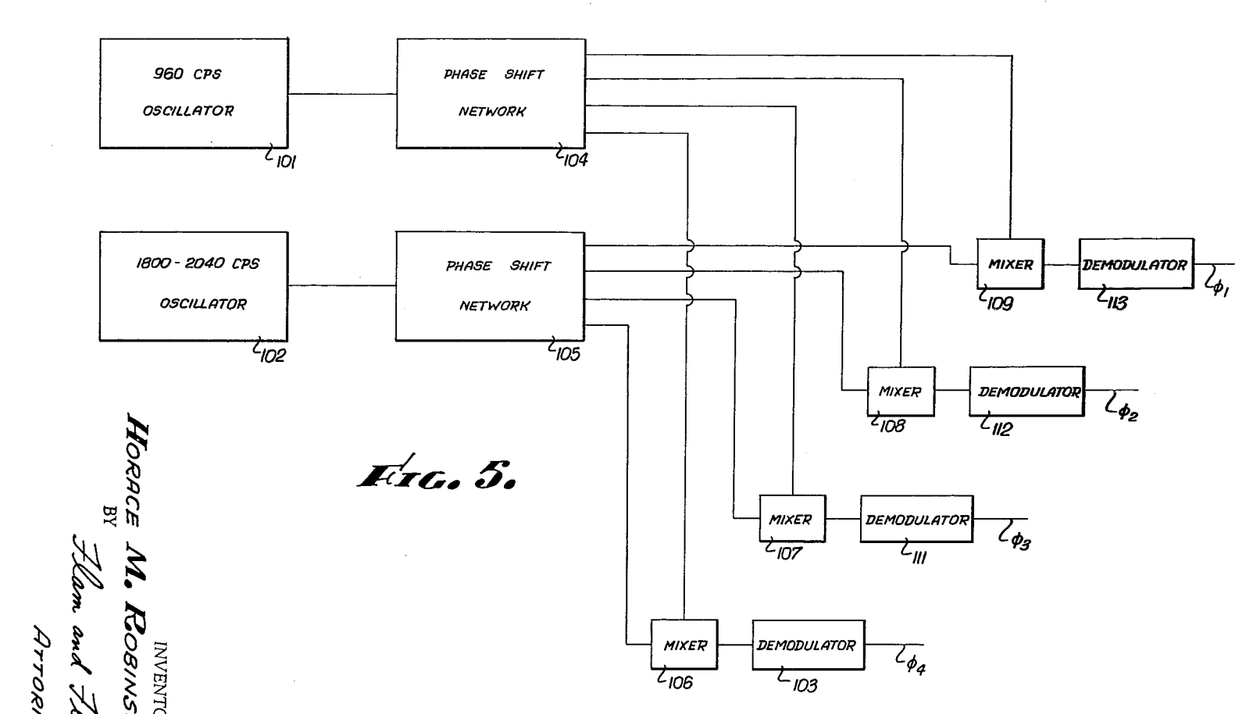
FIG. 5 is a block diagram illustrating a four-phase power supply having the characteristic of 180° phase shift at zero frequency.

In FIG. 5, there is illustrated by block diagram a four-phase power supply suitable for use in providing the several phase voltages $\phi_1$, $\phi_2$, $\phi_3$ and $\phi_4$. The supply furthermore includes means for reversing the sequence of the phase voltages as the frequency passes through zero, thereby avoiding the requirement of a separate switching device.

The power supply comprises two oscillators 101 and 102, one of which, 102, has a frequency that may be adjusted through a continuous range to values above and below the frequency of the other oscillator 101. Preferably, to avoid excessive filtering, the oscillators provide equal amplitude output. Upon mixing the outputs of the oscillators, a beat frequency is derived, as by the use of a simple demodulator 103. A 180° phase shift occurs as the frequency of the variable oscillator 102 passes through a value corresponding to the frequency of the standard or local oscillator 101.

In order to produce four synchronized phase voltages of correlated frequencies, phase shifting devices 104 and 105 are respectively associated with the oscillators 101 and 102. At least one of these devices, which incorporate suitable filtering means and the like, produces four 90° phase related outputs for use in a system. Four separate mixers 106, 107, 108 and 109 serve to combine the signals from the local or standard oscillator 101 with the corresponding variable frequency output from the oscillator 102. Demodulators 111, 112 and 113 fed by the mixers provide the other several phase voltages $\phi_2$, $\phi_3$ and $\phi_4$. The demodulators, for example, may comprise any simple rectifying device. Further, the demodulators may include suitable low pass filters capable of passing direct current corresponding to zero frequency.

The variable oscillator 102 can be calibrated to read "speed forward" and "speed reverse." Accordingly, a single control is provided for determining the mode of motion of the motor.

The output of the oscillator 102 can be intercepted and recorded, as for example, on magnetic tape. A memory of desired motor movements can thereby be stored. Actually it may not be necessary to record the output of the fixed oscillator 101, but this may prove convenient.

A single tape may record desired simultaneous movements of companion motors, as for example, to determine $x$ and $y$ coordinates of a stylus, or to determine three coordinates of a router arm. For each additional motor in the system, only one additional tape channel is required, the local oscillator recordings, if used, being available for all of the motors.

The inventor claims:

1. A modulator for controlling the flow of current from an alternating current source, comprising: a switch capable of being turned on by the application of a gating signal, and turning off upon cessation of current in the absence of a gating signal; a unijunction transistor having bases and an emitter; a pulse of current passed through the unijunction transistor providing said gating signal; means deriving from said source an interbase biasing potential for said unijunction transistor that is positive for periods corresponding to alternate halves of the source cycle; a capacitor connected to the emitter of said unijunction transistor for firing it; and a charging circuit for said capacitor cooperable with a controllable frequency pilot source, whereby the time during the cycle of the alternating current source at which the gating signal is produced corresponds to the then amplitude of the signal of the pilot source.

2. A modulator for controlling the flow of current from an alternating current source, comprising: a switch capable of being turned on by the application of a gating signal, and turning off upon cessation of current in the absence of a gating signal; a unijunction transistor having bases and an emitter; a pulse of current passed through the unijunction transistor providing said gating signal; means deriving from said source an interbase biasing potential for said unijunction transistor that is positive for periods corresponding to alternate halves of the source cycle; a capacitor connected to the emitter of said unijunction transistor for firing it; and a charging circuit for said capacitor cooperable with a controllable frequency pilot source including an adjustable resistor whereby the time during the cycle of the alternating current source at which the gating signal is produced corresponds to the then amplitude of the signal of the pilot source.

3. A modulator for controlling the flow of current from an alternating current source, comprising: a switch capable of being turned on by the application of a gating signal, and turning off upon cessation of current in the absence of a gating signal; a first and a second unijunction transistor each having bases and an emitter; a pulse of current through either of said unijunction transistors providing a gating signal; means deriving from said source, interbase biasing voltages for said unijunction transistors respectively that are alternately positive for periods corresponding to alternate halves of the source cycle; a first and a second capacitor respectively connected to the emitters of the unijunction transistors for firing them; and charging circuits for said capacitors cooperable with opposite phases of a controllable frequency pilot source whereby the time during the cycle of the alternating current source at which the gating signal is produced corresponds to the then amplitude of the signal of the pilot source.

4. A modulator for controlling the flow of current from an alternating current source to a number of motor winding sections, comprising: a switch for each of the motor windings, and each capable of being turned on by the application of a gating signal, and turning off upon the cessation of current in the absence of a gating signal; a pair of unijunction transistors for each switch, each unijunction transistor having bases and an emitter; a pulse of current through either unijunction transistor of each pair of transistors providing a gating signal for the corresponding switch; means deriving from said source two biasing voltages that are alternately positive for periods corresponding to alternate halves of the source cycle; the unijunctions of each pair being respectively biased by said biasing voltages; a capacitor for each unijunction transistor for firing the same; charging circuits for the capacitors of each pair of unijunction transistors cooperable with opposite phases of a controllable frequency pilot source; the pilot sources for the said charging circuits having a fixed multiple phase relationship.

5. A modulator for controlling the flow of current from an alternating current source to four motor winding sections comprising: four controllable switches for the winding sections capable of being turned on by the application of a gating signal and turning off upon cessation of current in the absence of a gating signal; a pair of unijunction transistors for each switch and each having bases and an emitter; a pulse of current through either unijunction transistor of any pair providing a gating signal for the corresponding switch; means deriving from said source a pair of interbase biasing potentials for the unijunction pairs respectively that are alternately positive for periods corresponding to alternate halves of the source cycle; a capacitor for each unijunction emitter for firing it; a four phase controllable frequency pilot source; charging circuits derived from two opposite phases of the said four phase source for the capacitors of the respective pairs of unijunction transistors.

6. In a modulator cooperable with a source of alternating current: switch means for connecting a load to said source; means for producing a multiphase pilot signal each phase of which has a degree of symmetry relative to its axis substantially to define successive half cycles of the corresponding phase; first circuit means operative during periods corresponding to first half cycles of one of the phases of the pilot signal and first half cycles of the source cycle for operating said switch means throughout a phase angle of the source cycle corresponding substantially to the instantaneous amplitude of the said one phase of the pilot signal; second circuit means operative during periods corresponding to second half cycles of said one phase and first half cycles of the source cycle for operating said switch means throughout a phase angle of the source cycle corresponding substantially to the instantaneous amplitude of the said one phase of the pilot signal; third circuit means operative during periods corresponding to first half cycles of said one phase and second half cycles of the source cycle for operating said switch means throughout a phase angle of the source cycle corresponding substantially to the instantaneous amplitude of the said one phase; fourth circuit means operative during periods corresponding to second half cycles of said one phase and second half cycles of the source cycle for operating said switch means throughout a phase angle of the source cycle corresponding substantially to the instantaneons amplitude of the said one phase; and controllable means for determining the frequency of said pilot signal.

7. In combination: four pairs of firing means for silicon controlled rectifiers or the like designated for reference purposes herein as 1a, 1b, 2a, 2b, 3a, 3b, 4a and 4b; a four phase power supply having a controllable frequency; a motor having four windings designated for reference purposes herein as winding 1, winding 2, winding 3 and winding 4; said windings being arrayed to provide axes in angularly spaced relationship; a switch operated by either firing means 1a or 1b for connecting winding 1 to a source of alternating current; corresponding switches for the remaining windings; means cyclically providing biases for the a firing means as a set and the b firing means as a set, and in 180° phase shifted relationship, with frequency corresponding to that of said source comprising a load resistor and a constant voltage device together connected in series across said source, there being a polarity sensing network connecting two biasing terminals respectively to one side of said constant voltage device upon alternations of the source; a reactance for each firing means for storing energy for firing it; and circuit means for supplying energy to the reactances for firing means 1a and 3b from the first phase of said source, reactances for firing means 2a and 4b from the second phase of said source, reactances for firing means 3a and 1b from the third phase of said source, and reactances for firing means 4a and 2b from the fourth phase of said source.

8. In combination: a motor having at least two windings having spaced axes; a switch for each winding for connecting the corresponding winding to a source of alternating current; means for producing multiphase cyclic pilot signals corresponding to the number of motor windings and having a fixed relative frequency relationship; said pilot signals having a degree of symmetry relative to their axes to define successive half cycles of the corresponding phases; and a modulator for each switch and cooperable with the respective pilot signal producing means, each comprising first circuit means operative during periods corresponding to first halves of the corresponding pilot signal cycle and first halves of the source cycle for operating the corresponding switching means throughout a phase angle of the source cycle corresponding substantially to the instantaneous amplitude of the pilot signal, and second circuit means operative during periods corresponding to second halves of the pilot signal cycle and first halves of the source cycle for operating the corresponding switch throughout a phase angle of the source cycle corresponding substantially to the instantaneous amplitude of the pilot signal; said means for producing pilot signals including, for each phase, relatively fixed frequency oscillation means and second oscillation means the frequency of which may be substantially continuously varied between values above and below the frequency of the fixed frequency oscillator means, mixing means for said oscillator means and means for deriving a beat frequency signal for use as a pilot signal.

9. In combination: a motor having at least two windings having spaced axes; a switch for each winding for connecting the corresponding winding to a source of alternating current; means for producing multiphase cyclic pilot signals corresponding to the number of motor windings and having a fixed relative frequency relationship; said pilot signals having a degree of symmetry relative to their axes to define successive half cycles of the corresponding phases; and a modulator for each switch and cooperable with the respective pilot signal producing means, each comprising first circuit means operative during periods corresponding to first halves of the corresponding pilot signal cycle and first halves of the source cycle for operating the corresponding switching means throughout a phase angle of the source cycle corresponding substantially to the instantaneous amplitude of the pilot signal, and second circuit means operative during periods corresponding to second halves of the pilot signal cycle and first halves of the source cycle for operating the corresponding switch throughout a phase angle of the source cycle corresponding substantially to the instantaneous amplitude of the pilot signal; said means for producing pilot signals including a relatively fixed frequency oscillator having a corresponding number of phase related outputs, a second oscillator the frequency of which may be substantially continuously varied between values above and below the frequency of the fixed frequency oscillator and having a corresponding number of phase related outputs; a corresponding number of means for deriving from pairs of said outputs, phase related beat frequency signals for use as said pilot signals.

References Cited by the Examiner
UNITED STATES PATENTS
| | | | |
|---|---|---|---|
| 2,664,533 | 12/1953 | Raab | 318—327 X |
| 2,665,403 | 1/1954 | Pestarini | 318—165 |
| 2,722,649 | 11/1955 | Immel et al. | 307—88.5 |
| 3,089,992 | 5/1963 | Seney | 318—227 X |
| 3,108,215 | 10/1963 | Pettit | 318—227 |
| 3,109,131 | 10/1963 | Byrd | 318—341 |

OTHER REFERENCES
Publication: G.E. SCR Manual, 2nd Edition, Auburn, New York, 1961 pages 115–117 and 132–133.

ORIS L. RADER, *Primary Examiner.*